2,945,004

Patented July 12, 1960

2,945,004

EPOXIDE RESINS REACTED WITH POLYHYDRIC PHENOLS

Sylvan Owen Greenlee, Racine, Wis., assignor to Devoe & Raynolds Company, Inc., Louisville, Ky., a corporation of New York No Drawing. Continuation of application Ser. No. 315,424, Oct. 17, 1952. This application May 29, 1956, Ser. No. 587,958

2 Claims.  (Cl. 260—47)

This invention relates to epoxide resin compositions which are valuable compositions for use in the manufacture of long chain polymeric products and of infusible, insoluble products. The invention includes the new compositions, the method of producing them, and the method of making infusible products therefrom.

The new compositions include a polyhydric phenol and an epoxide resin resulting from the reaction of a mixture of a dihydric phenol with epichlorhydrin or glycerol dichlorhydrin and sufficient caustic alkali to combine with the chlorine of the chlorhydrin, the proportion of chlorhydrin (epichlorhydrin or glycerol dichlorhydrin) to dihydric phenol being at least about 1.2 to 1 and up to around 2 to 1.

The invention also includes a two step method of forming long chain polymeric products and infusible insoluble products in which an initial low molecular weight or melting point epoxide resin is first produced by the reaction of a dihydric phenol with an excess of epichlorhydrin or glycerol dichlorhydrin in the presence of caustic alkali sufficient to combine with the chlorine of the chlorhydrin, followed by removal of the byproduct salt and any excess alkali from the initial epoxide resin, with addition of dihydric phenol to the initial epoxide resin in approximately equivalent proportions, and heating the resulting mixture to effect reaction of the dihydric phenol with the epoxide resin to form long chain polymeric products or insoluble and infusible reaction products.

In the first step of the two-step process, low molecular weight or melting point epoxide resins are produced which can be readily washed free from byproduct salt and any excess caustic alkali. When the low melting point or low molecular weight epoxide resins are further reacted with the dihydric phenol in approximately equivalent proportions in the second step of the process, no by-products are formed, and the reaction is a direct reaction of addition between the epoxide resin and the added polyhydric phenol in the second step of the process.

The dihydric phenols used for reaction with the epoxide resins to form the long chain polymeric products or the infusible, insoluble phenol reaction products are difunctional and, when used in approximately equivalent proportions, form compositions with the epoxide resins which readily are covertible, particularly in the presence of a catalyst such as an alkaline catalyst, to long chain polymers, or to infusible insoluble products.

The epoxide resins which are used with the dihydric phenols in making the new compositions are resins which result from the reaction of polyhydric phenols and chlorhydrins such as epichlorhydrin and glycerol dichlorhydrin. In making these resins, the proportions of polyhydric phenols and chlorhydrins are such that, for example, in the case of a dihydric phenol and epichlorhydrin or a dichlorhydrin, substantially more than 1 molecular proportion of a difunctional chlorhydrin is used for 1 molecular proportion of dihydric phenol, and 2 or substantially less than 2 molecular proportions of the difunctional chlorhydrin are used for 1 molecular proportion of the dihydric phenol. Similarly with other polyhydric phenols and other polyfunctional chlorhydrins, the proportions are such that the halohydrin is more than that which is equivalent to the polyhydric phenol and twice or less than twice the equivalent amount.

In making the epoxide resins from chlorhydrins, the reaction of the polyhydric phenols and the chlorhydrins is advantageously carried out with the use of aqueous alkali in amount sufficient to combine with the chlorine of the chlorhydrins used, or in amount somewhat in excess, as where the dihydric phenol is reacted with an epihalohydrin such as epichlorhydrin, the proportion of the alkali used is sufficient to combine with the chlorine of the epichlorhydrin or an amount somewhat in excess of that amount. When a dihalohydrin such as glycerol dichlorhydrin is used, the amount of alkali is sufficient to combine with the chlorine of the dichlorhydrin, or an amount somewhat in excess of that amount. And when mixtures of epichlorhydrin and dichlorhydrin are used, the amount of alkali is similarly sufficient to combine with the chlorine or somewhat in excess of that amount.

The epoxide resins vary somewhat in their compositions and properties depending upon the dihydric phenols and chlorhydrins used and the conditions of the reaction.

The primary reaction involved in producing the epoxide resins from dihydric phenols and difunctional chlorhydrins, appears to be one in which the phenolic hydroxyls react with the chlorhydrins to give monomeric and straight chain polymeric products such as illustrated by the following formulas or structures:

$$R_1-O-R-O-R_1$$

$$R_1-[O-R-O-R_2]_n-O-R-O-R_1$$

where R is the residue of a dihydric phenol, $R_2$ is an intermediate hydroxyl-containing residue of the chlorhydrin or dichlorhydrin, and $R_1$ is mainly an epoxy-containing residue and to some extent a hydroxyl-containing residue derived from the chlorhydrin. In the above formula, $n$ represents the extent of polymerization, e.g. 1, etc.

In general the proportion of terminal epoxide residues or groups in the epoxide resin is in considerable excess of the terminal hydroxide-containing residues, so that the products approach diepoxides, e.g., diglycidyl ethers and polymeric ethers of the dihydric phenols.

The above formula of the polymeric epoxide resins assumes straight chain reaction which apepars to be the primary reaction between the dihydric phenols and epichlorhydrin or dichlorhydrin. Reaction is not, however, excluded between the halohydrin and intermediate alcoholic hydroxyl groups such as would give branch chain formulas; and in the case of more complex polymers, where $n$ in the above formula is higher than 1, such side chain reaction products and polydimensional polymers are probably formed to some extent either by reaction of intermediate hydroxyl groups of intermediate reaction products with the halohydrin or with terminal epoxy groups of other intermediate reaction products. Since terminal epoxy groups can also react with terminal hydroxyl groups, it may be that part of the polymerization takes place in this way.

It is difficult to determine the exact nature of the complex polymerization process which takes place, but I am led to believe that the reaction is primarily one between the phenolic hydroxyls and the chlorhydrins and to a limited extent one of reaction of halohydrins or epoxide groups with aliphatic hydroxyl groups, and that the resulting complex hydroxy-epoxy compositions are largely straight-chain polymeric products of the formula indicated above and to some extent more complex polydimensional structures.

The epoxide resins vary from liquid or semi-solid products to solid resins.

The polyhydric phenols used in making the intermediate epoxide resins may contain the hydroxyl groups in one nucleus as in resorcinol or in different nuclei of fused ring systems as in 1,5-dihydroxynaphthalene or in different nuclei or ring systems attached by chains composed of one or more atoms, in which case the chains should be free from elements which interfere with the reaction of chlorhydrins with the phenolic hydroxyl groups. The phenolic nuclei or the chains linking phenolic nuclei may contain substituents provided they do not interfere with the desired reaction of the chlorhydrins with the phenolic hydroxyl groups. Illustrative of polyhydric phenols which may be used in making the new complex polymerization products are mononuclear phenols such as resorcinol, hydroquinone, catechol, etc. and polynuclear phenols such as bisphenol (p,p'-dihydroxydiphenyldimethyl methane), p,p'-dihydroxybenzophenone, p,p'-dihydroxydiphenyl, p,p'-dihydroxydibenzyl, bis-(4-hydroxyphenyl) sulfone, 2,2'-dihydroxy 1,1'-dinaphthyl methane, dihydroxy naphthalenes and anthracenes, and other dihydroxy or dihydroxy diphenyl or dinaphthyl methanes, etc.

A particularly advantageous polyhydric phenol for use in making the new compositions is bisphenol (p,p'-dihydroxydiphenyldimethyl methane).

The difunctional or polyfunctional chlorhydrins useful in making the initial epoxide resins include monochlorhydrins such as epichlorhydrin, dichlorhydrins such as glycerol dichlorhydrin, bis (3-chloro-2-hydroxy propyl) ether, 1,4-dichloro, 2,3-dihydroxy-butane, 2-methyl-2-hydroxy, 1,3-dichloropropane, bis (3-chloro, 2-methyl,2-hydroxy propyl) ether and other mono and dichlorhydrins derived from aliphatic olefins, mannitol, sorbitol and other alcohols. Epichlorhydrin is particularly advantageous for use in making the initial resins in the first step of the process.

In making the epoxide resins from chlorhydrins, the dihydric phenols, e.g., bisphenol, and the polyfunctional chlorhydrins are advantageously all added together at the outset together with aqueous alkali which may be used to dissolve or partly dissolve the polyhydric phenol to form the polyphenoxide or a monophenoxide either before admixture with the chlorhydrin or after admixture. The amount of caustic alkali added to dissolve or partially dissolve the phenol, and whether present at the outset or added in successive amounts, should be sufficient to combine with the chlorine of the chlorhydrin used. With epichlorhydrin, for example, the amount of caustic alkali should be equal to or somewhat in excess of the theoretical amount for combining with the chlorine of the epichlorhydrin. With glycerol dichlorhydrin 2 mols of caustic alkali or somewhat more are required for 1 mol of the dichlorhydrin. The presence of an excess of alkali is advantageous in securing completion of the reaction, and also influences the polymerization and the nature of the polymerization products as well as the relative proportions of epoxide groups and terminal hydroxycontaining groups.

Products of a predetermined degree of polymerization and of different degrees of polymerization can be obtained by regulating the proportions of the reactants used. Thus, to give a composition having the general or approximate composition indicated by the above formula where $n=1$ the proportions of epichlorhydrin and bisphenol should be about 3:2. Products of higher degree of polymerization and increased complexity of composition are obtained with lower ratios of epichlorhydrin to bisphenol. For example, a product made from 5 mols of epichlorhydrin and 4 mols of bisphenol would have a theoretical composition approximating that of the above formula where $n=3$. A low molecular weight resin varying from a liquid to a soft solid and with a large proportion of liquid monomeric polyethers of dihydric phenols can be made by reacting 2 mols of epichlorhydrin with 1 mol of bisphenol. Yields of products can be obtained which represent or approximate the theoretical yields indicating that the complex polymerization products contain the phenolic and halohydrin residues in substantially the same proportion in which the reactants are used.

The range of proportions and degree of polymerization in making the resins can be varied over a considerable range, but the chlorhydrin should be in substantial excess of the equivalent proportions to insure terminal epoxy-containing groups and should be twice or less than twice the equivalent proportions. The production of the polymeric products requires in general, in the case of a dihydric phenol and epichlorhydrin or dichlorhydrin, a range of proportions varying from about 2 of the polyhydric phenol and 3 of the difunctional chlorhydrin to a higher proportion of polyhydric phenol to chlorhydrin approaching equivalent proportions but with sufficient excess of the chlorhydrin over equivalent proportions so that the complex polymeric products will contain terminal epoxide groups. With bisphenol and epichlorhydrin ranges of proportions corresponding to that of the above formula where $n$ is from 1 to 5 are particularly advantageous, giving complex reaction products having a melting point up to around 100° C. or higher and from which the salt formed as a by-product and any excess caustic may be removed by washing.

Higher polymeric products of higher melting point which cannot be readily washed to remove salt or any excess caustic can advantageously be produced by the two-step process in which a lower melting polymeric product is first formed which can be readily freed from by-product salt and excess caustic, and with further reaction of this intermediate purified product with an additional amount of dihydric phenol which is less than the equivalent of the epoxide groups of the intermediate product so that the higher polymeric products will still contain epoxy groups.

The process which can be advantageously used in preparing the initial epoxide resins will be illustrated in connection with the reaction of bisphenol with epichlorhydrin.

A caustic soda solution is made containing 1 mol caustic soda per mol of bisphenol dissolved in an amount of water, e.g., twice that of the weight of the bisphenol to be used. The bisphenol is then added to the caustic solution in a suitable reaction kettle provided with a stirrer and stirred until the phenol is dissolved. The use of this amount of alkali is sufficient to convert only half of the phenolic hydroxyls of the bisphenol into phenoxide. The epichlorhydrin is then added to the solution at a temperature of 34–45° C. with continuous agitation of the reaction mixture. The temperature rises over a period of e.g., 30 minutes to around 60–75° C. depending upon the initial temperature, the batch size and the amount of water used, larger amounts of water tending to control the exothermic reaction temperature. The temperature rise due to the exothermic reaction can be controlled to some extent by using larger or smaller amounts of water.

After this preliminary reaction an additional amount of sodium hydroxide conveniently in water solution, and sufficient in amount, with that previously added, to react completely with the chlorine of the epichlorhydrin, is added, and heat is applied if necessary to raise the temperature to around 80–85° C. over a period of around 15–20 minutes. A further amount of sodium hydroxide in water is adventageously added at this point, in excess of the theoretical amount required to react with all of the chlorine present in the epichlorhydrin, and this amount may advantageously be an appreciable excess of caustic soda to secure a higher degree of polymerization in the reaction mixture or to bring the reaction to the desired extent in a shorter period of time. The mixture is heated to around 95° C. and held at around 95-100° C. for a sufficient length of time to give the desired products which may vary e.g. from ½ hour to 3 hours or more.

The reaction mixture separates into an upper aqueous layer which is drawn off and the residue, e.g., of taffy-like consistency settles to the bottom. This product is then washed by stirring with hot water for 25-30 minutes after which the wash water is drawn off. This washing procedure is repeated e.g., 4 to 6 times, or as many times as is necessary, to effect removal of any unreacted sodium hydroxide and the byproduct sodium chloride. Dilute acids such as acetic or hydrochloric acid may be used to neutralize the excess caustic during washing. It is usually desirable to wash the product entirely free from salt and caustic since failure to remove the unreacted caustic or basic salts such as sodium acetate may result in further polymerization during the drying process when heat is applied to remove the last traces of water. The wet resin is dried by heating and stirring until the temperature rises substantially above the boiling point of water.

The above procedure has been found an advantageous procedure for use in producing the initial epoxide resins. The addition of alkali in stages and with only partial conversion of bisphenol into phenoxide in the first stage results in reaction of the bisphenol with part of the epichlorhydrin and the removal of chlorine from only part of the epichlorhydrin while part of the phenolic hydroxyl of the bisphenol are left in a free state such that they are free to react with epoxide groups. The subsequent addition of caustic is sufficient to remove chlorine from the remaining epichlorhydrin in the further carrying out of the process while the use of a regulated excess of alkali over that required for combining with the chlorine to form salt aids in promoting and controlling the further carrying out of the process.

Where all of the caustic alkali is added at the beginning of the process and all of the reactants are added, the reaction is more exothermic and temperature control may be necesary by external cooling or the addition of ice or cold water to keep the reaction under control. Excessive amounts of caustic sometimes causes further polymerization so that it becomes difficult to control the melting point of the product. Lesser amounts of excess caustic approaching the theoretical require longer reaction periods for the process. In general the process should be controlled so that the reaction product does not have a melting point more than 10-15° higher than the temperature of the water used for washing. Thus a product having a softening point or melting point (Durran's Mercury Method) of around 60° C. may be prepared and washed at a temperature above e.g., 45-50° C. A product whose softening point is around 125° C. may be prepared and washed in a closed pressure kettle at temperatures above 110-115° C.

A typical example illustrative of the process in which approximately 3 mols of bisphenol is reacted with 4 mols of epichlorhydrin and an amount of sodium hydroxide approximately 25% in excess of the theoretical is carried out as follows: The ingredients used were as follows: 307.5 pounds bisphenol, 166.3 pounds epichlorhydrin, 96 pounds caustic soda, 600 pounds water. 54 pounds of the caustic were dissolved in 600 pounds of water in an open kettle provided with a mechanical agitator. The bisphenol was added and the mixture stirred for about 10 minutes at a temperature of about 33° C., the epichlorhydrin was added and the temperature increased to about 65° C. from the exothermic heat of reaction. A solution of 18 pounds of caustic soda dissloved in 4 gallons of water was then added with continued stirring with a rise of temperature to around 79° C. Heat was applied to raise the temperature to about 85° C. and a solution of 24 pounds of caustic soda dissolved in 5 gallons of water was added and heating continued while maintaining a temperature around 90 to 100° C. for a period of about 1 hour. External heating was discontinued, 5 gallons of cold water added to check boiling of the water and the upper aqueous layer was then drawn off.

The product was washed with 50-60 gallons of boiling water for a period of 20 minutes, then with a similar amount of boiling water containing acetic acid to neutralize unreacted caustic soda and then 4 times in succession with a similar amount of boiling water. After as much as possible of the water had been removed, external heat was applied with continued stirring to dry the product, the temperature rising to 150° C. The liquid product was drawn off and allowed to solidify, and had a softening point of 95° C. (Durran's Mercury Method).

Higher melting point products which cannot be readily washed with water may advantageously be prepared by proceeding in two steps. Thus where products are desired having a melting point of, e.g., around 150° C., such that they cannot be readily freed from salt and excess caustic by washing, they can advantageously be produced by a two-step procedure. While such a product, if prepared by the above process, could be washed in a pressure kettle with water heated to around 145-150° C., this requires special pressure equipment. The use of such high pressures and temperatures is avoided when the following two-step procedure is used.

In this two-step procedure an epoxide-containing product is first produced which melts e.g. at 80° C. Such a product can be easily prepared at temperatures above 65-70° C. and washed with hot water at atmospheric pressure in an open or closed kettle. This product, free from caustic, water and salts, is then admixed with an additional amount of dihydric phenol, less than that corresponding to the epoxy content of the product with which it is admixed, and the mixture then heated to effect the action of the polyhydric phenol with part of the epoxy groups of the initial product to give an epoxide resin that melts e.g. at 150° C. and which needs no purification since no byproducts are formed in this second step of the process.

In some cases it is desirable, in the second step of the two-step process of producing higher melting point epoxide resins, to add traces of catalysts such as sodium hydroxide or sodium acetate, to catalyze the further reaction to produce the higher melting epoxide products, but these catalytic substances are used in such small quantities that they are not detrimental to the product for most of its uses, and their removal by washing or other methods is unnecessary.

In order to regulate the amount of dihydric phenol which is added to the low melting point resin to produce a higher melting point epoxide resin, the epoxide equivalent of the initial epoxide resin is determined, as hereinafter described, and an amount of dihydric phenol is added which is less than that equivalent to the epoxide content so that only part of the epoxide groups of the complex composition are utilized in forming the further polymeric product, and leaving an excess of epoxide content of the resulting product such that it is still an epoxyhydroxy product, still capable of reaction e.g., by polymerization with the addition of a polymerization catalyst, or cross-linking reactant.

The epoxide resins which are to be further reacted with the dihydric phenols can also be produced by a two-step process in which an excess of dihydric phenol is reacted with less than the equivalent of epichlorhydrin and caustic alkali to produce a complex dihydric phenol which is further reacted with an excess of epichlorhydrin and caustic alkali to form the epoxide resin, or which is further reacted with an excess of epoxide resin to form a higher melting point resin.

The epoxide resins, whether those initially produced by a one-step process, or of higher melting point produced by further reaction of the resins first produced to form higher melting point epoxide resins, are used in admixture with additional dihydric phenol in making the new compositions. When a dihydric phenol is used, the proportion of added dihydric phenol is approximately equivalent to the epoxide content of the resin, so that, for example, the number of phenolic hydroxyls of the dihydric phenol is approximately equivalent to the number of epoxide groups of the epoxide resin. The dihydric phenol used may itself be a reaction product, such as above referred to, resulting from the reaction of an excess of dihydric phenol with less than the equivalent of epichlorhydrin and caustic alkali.

The nature and advantages of the invention will be further illustrated by the following specific examples, but it will be understood that the invention is not limited thereto. The parts are by weight.

The epoxide group content of the epoxide resins, both those initially produced and the more complex higher melting point epoxide resins produced by the two-step process, was determined for practical purposes by determining the equivalent weight of the composition per epoxide group. The method used for determining the epoxide content of the epoxide resins hereinafter indicated was by heating one gram sample of the epoxide composition with an excess of pyridine containing pyridine hydrochloride (made by adding 16 cc. of concentrated hydrochloric acid per liter of pyridine) at the boiling point for 20 minutes and back titrating the excess pyridine hydrochloride with 0.1 N sodium hydroxide using phenolphthalein as indicator, and considering that 1 HCl is equivalent to one epoxide group.

Example 1 illustrates the production of an epoxide resin suitable for reaction with a polyhydric phenol.

*Example 1.*—798 parts of bisphenol were dissolved in a caustic soda solution made by dissolving 200 parts of caustic soda in 1730 parts of water in a stainless steel kettle, and 650 parts of epichlorhydrin were added to the closed kettle. The kettle was provided with a stirrer and the mixture was stirred during the process. The temperature rose from around 37° C. to around 70° C. in about 45 minutes. 80 parts of caustic soda in 200 parts of water were then added with further increase in temperature to about 82° C. in about one-half hour. 29 parts of caustic soda in 100 parts of water were then added and the kettle was heated to raise the temperature gradually to about 95° C. in about one hour. The aqueous liquor was then drawn off and hot wash water applied with agitation, and a series of four washing treatments with fresh water was applied until the product became neutral to litmus. The product was then dried by heating to a final temperature of 130° C., and drawn from the kettle.

In the above example, 2 mols of epichlorhydrin are used for 1 mol of bisphenol with an amount of caustic soda somewhat in excess of 2 mols. The softening point of the resulting resinous product determined by Durran's Mercury Method was 43° C. The approximate molecular weight determined by a standard boiling point elevation method was about 451. The determination of the epoxide groups in the product showed an equivalent weight of 325 per epoxide group which would represent approximately 1.39 epoxy groups per molecule of the average molecular weight indicated, and an equivalent weight to esterification of 84.5.

While the product is a homogeneous product, it is a composite product made up of monomeric and polymeric epoxide ethers of bisphenol. By fractional extraction with normal heptane a liquid fraction is obtained, leaving a higher melting point resin. By fractional distillation at 1 micron pressure and between 160° C. and 300° C. approximately half the material distilled and a large part of this distillate was liquid and apparently made up largely of diglycide ether of bisphenol with some hydrolyzed epoxide and some polymeric product. Fractions were thus obtained having an epoxide equivalent of 183 to 184 and fractions having somewhat higher epoxide equivalents up to around 300. The residual resin had a melting point of about 62.5° C. and an epoxide equivalent of about 525. In referring to average molecular weight based on a standard boiling point elevation method, accordingly, and epoxide groups per molecule based on the average molecular weight, these figures do not represent a homogeneous, uniform product but a mixture of monomeric and polymeric liquid and solid resins including diepoxides and polymeric and hydrolyzed products.

The following example illustrates the reaction of the resin of Example 1 with polyhydric phenol.

*Example 2.*—28.5 parts of bisphenol (¼ mol of phenolic OH) was dissolved in 50.5 parts of technical grade diglycide ether of bisphenol having an epoxide equivalent of 202 (¼ mol of epoxide). A portion of this solution was heated at 200° C. for 5 hours to give a product having a melting point of 149° C. and an epoxide equivalent of 10,250. To 25 parts of the original solution was added 1.66 parts of a 15% solution of sodium phenoxide in ethylene glycol (1% catalyst). After heating 1 hour at 200° C., the catalyzed mixture was an insoluble, infusible product.

*Example 3.*—The epoxide resin was one produced from bisphenol, epichlorhydrin and caustic alkali having a melting point of 50° C. and an epoxide equivalent of 348. 28.5 parts of bisphenol (¼ mol of phenolic OH) was dissolved in 87 parts of such resin (¼ mol of epoxide). To the resulting solution was added 0.5% sodium phenoxide. This mixture gave an insoluble product after heating for 5 minutes at 200° C.

*Example 4.*—The epoxide resin used was produced from bisphenol, epichlorhydrin and caustic alkali and had a melting point of 81° C. and an epoxide equivalent of 634. 14.2 parts of bisphenol (⅛ mol of phenolic OH) was dissolved in 79.3 parts of such resin (⅛ mol of epoxide). A portion of this solution, when heated to 200° C. for 5 hours without a catalyst gave a product having a melting point of 178° C. and an epoxide equivalent of 9670. A portion of the solution with the addition of 0.5% sodium phenoxide, gave a hard, tough, infusible product when heated to 200% C. for 5 minutes.

*Example 5.*—The epoxide resin used was produced from bisphenol, epichlorhydrin and caustic alkali and had a melting point of 98° C. and an epoxide equivalent of 948.

11.4 parts of bisphenol (0.1 mol of phenolic OH) was dissolved in 94.8 parts of such resin (0.1 mol of epoxide). A portion of this solution was heated at 200° C. for 5 hours to give a product having a melting point of 167° C. and an epoxide equivalent of 10,250. To another portion of the solution was added 0.5% sodium phenoxide and this mixture when heated for 1 hour at 200° C. gave a tough, infusible product. A 50% solution of the catalyzed mixture in Cellosolve acetate was cast on glass in a 3 mil film and baked for 1 hour at 200° C. to give a tough, flexible, solvent resistant film.

*Example 6.*—The epoxide resin used was a high melting point epoxide resin produced by heating 1000 parts of the epoxide resin referred to in Example 5 with 50 parts of bisphenol, the mixture being gradually heated with stirring to a temperature of 200° C. and held at this temperature for 1½ hours. The epoxide resin, when cold, was a hard, brittle, resinous solid having a melting point of 128° C. and a weight per epoxide of 1700.

5.71 parts of bisphenol (0.05 mol of phenolic hydroxide) was dissolved in 85 parts of such high melting point resin (0.05 mol of epoxide). A portion of this solution was heated for 5 hours at 200° C. to give a product having a melting point of 171° C. and an epoxide equivalent of 8,850. To another portion of this solution was added 0.5% sodium phenoxide and the mixture was heated at 200° C. for 1 hour to give a tough, hard, infusible product. A 50% solution of the catalyzed mixture in Cellosolve acetate was used to cast a 3 mil film on glass. After baking at 200° C. for 1 hour the film was hard, tough and flexible.

*Example 7.*—A high melting point resin was produced by heating 1000 parts of the epoxide resin referred to in Example 5 with 77.5 parts of bisphenol, the mixture being gradually heated with stirring to a temperature of 200° C. and being held at this temperature for 1½ hours. The product, when cold, was a hard, brittle, resinous solid having a melting point of 147° C. and an epoxide equivalent of 3923.

2.85 parts of bisphenol (0.025 mol of phenolic OH) was dissolved in 98.1 parts of such high melting point resin (0.025 mol of epoxide). A portion of this solution was heated for 5 hours at 200° C. to give a product having a melting point of 170° C. and an epoxide equivalent of 8,160. To another portion of this solution was added 0.5% sodium phenoxide and the mixture was heated at 200° C. for 25 minutes to give a hard, tough, infusible product.

*Example 8.*—5.5 parts of resorcinol (0.1 mol of phenolic OH) was dissolved in 94.8 parts of the same resin used in Example 5 (0.1 mol of epoxide).

A portion of this solution was heated for 5 hours at 200° C. to give a product having a melting point of 194 and an epoxide equivalent of 10,600. To another portion of the solution was added 0.5% sodium phenoxide and the mixture was heated at 200° C. for 1 hour to give a hard, tough, infusible product.

*Example 9.*—12.5 parts of dihydroxy, diphenyl sulfone (0.1 mol of phenolic OH) was dissolved in 94.8 parts of the same resin as used in Example 5 (0.1 mol of epoxide).

A portion of this solution when heated at 200° C. for 1 hour gave a tough, flexible, infusible product.

Thus, where the epoxide resin is a diglycide ether of a dihydric phenol, or a polymeric diglycide ether having the straight chain formula above indicated, and where the epoxide resin is reacted with a dihydric phenol in substantially equivalent amounts, the final product may be considered a reaction product of substantially equivalent proportions of dihydric phenol and epichlorhydrin with the properties of long chain polymers. This further reaction of the dihydric phenol and epoxide resin is promoted by the presence of small amounts of alkali catalysts, but at elevated temperatures, the alkali catalysts tend to effect further reaction to form insoluble infusible products rather than thermoplastic long chain polymers.

In general the production of infusible insoluble products by reaction of the dihydric phenols with the epoxide resins in substantially equivalent amounts is brought about by the use of a small amount of catalyst, particularly at elevated temperatures.

In general, the phenolic hydroxyls of the dihydric phenols appear to be much more reactive with epoxide groups than are alcoholic hydroxyl groups which may be present in the epoxide resins. And, when an alkali catalyst is used, it appears to promote preferential reaction of phenolic hydroxyl groups with epoxide groups, although the reaction of alcoholic hydroxyl groups with epoxide groups may take place in the final hardening operation at elevated temperatures.

The new compositions of the present invention can be used in the form of their initial admixture of epoxide resin and polyhydric phenol in the form of solutions, or admixed with fillers or pigments, to form paints or varnishes or coating solutions which, on heating, will give insoluble, infusible, films; or such compositions can be used in impregnating and laminating and coating wood fibers and other porous or fibrous materials, etc., with resulting heating to convert the product into an infusible, insoluble form.

Paints, enamels, etc. can thus be produced as well as molding mixtures and compositions which, in final form, are infusible, insoluble products.

The new epoxy resin compositions are accordingly valuable for use in making molding compositions and articles, as well as for making coating compositions, films, filaments, fibers, etc.

One advantage of the compositions is that on final hardening with a catalyst to form insoluble, infusible products, they tend to expand rather than to contract, which is valuable, e.g. in making molded articles where tight fitting molded articles are desired.

This application is a continuation of my prior application Ser. No. 315,424 filed October 17, 1952, now abandoned, which application is a continuation-in-part of my prior application Ser. No. 250,951, filed October 11, 1951, now Patent 2,615,008, which application is a continuation-in-part of my prior applications Ser. No. 189,063, filed October 7, 1950, and Ser. No. 199,932, filed December 8, 1950, both now abandoned, which prior applications are continuations-in-part respectively of my prior application Ser. No. 621,856, filed October 11, 1945, and Ser. No. 617,176, filed September 18, 1945, now abandoned.

I claim:

1. The three-step process of producing long chain polymers and insoluble, infusible products, which comprises first reacting a dihydric phenol free from reactive groups other than phenolic hydroxyl groups with more than 1 mol and not more than about 2 mols of a chlorhydrin selected from the class which consists of epichlorhydrin and glycerol dichlorhydrin in the presence of caustic alkali to form a low melting point epoxide resin, admixing with the epoxide resin a dihydric phenol free from reactive groups other than phenolic hydroxyl groups, with the proportion of dihydric phenol to epoxide resin less than that corresponding to the epoxide equivalent of the resin, heating to effect reaction of the dihydric phenol with said epoxide resin to form a higher molecular weight and higher melting point epoxide resin, and further reacting the resulting resin with a dihydric phenol in a sufficient proportion to produce an insoluble, infusible product.

2. The process according to claim 1 in which the dihydric phenol is reacted with said epoxide resin in admixture with about one percent of an alkaline catalyst and in which the amount of the dihydric phenol reacted in the third step is substantially equivalent to the epoxide content of said epoxide resin.

References Cited in the file of this patent

UNITED STATES PATENTS

| | | |
|---|---|---|
| 2,582,985 | Greenlee | Jan. 22, 1952 |
| 2,615,008 | Greenlee | Oct. 21, 1952 |